US008325152B2

United States Patent
Tseng

(10) Patent No.: US 8,325,152 B2
(45) Date of Patent: Dec. 4, 2012

(54) TOUCH PANEL WITH UNBALANCED CONDUCTIVE PATTERNS, AND TOUCH-CONTROLLED APPARATUS AND METHOD FOR DETERMINING MULTI-TOUCH THEREOF

(75) Inventor: Shu-Hung Tseng, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 596 days.

(21) Appl. No.: 12/554,990

(22) Filed: Sep. 8, 2009

(65) Prior Publication Data

US 2010/0328233 A1     Dec. 30, 2010

(30) Foreign Application Priority Data

Jun. 25, 2009   (TW) ............................... 98121346 A

(51) Int. Cl.
G06F 3/044   (2006.01)
(52) U.S. Cl. ..................................... 345/174; 178/18.06
(58) Field of Classification Search ........................ None
See application file for complete search history.

(56) References Cited

U.S. PATENT DOCUMENTS

| | | |
|---|---|---|
| 2005/0270039 A1 | 12/2005 | Mackey |
| 2008/0150906 A1 | 6/2008 | Grivna |
| 2009/0122024 A1 | 5/2009 | Nakamura |
| 2009/0128518 A1 | 5/2009 | Kinoshita |

*Primary Examiner* — Wayne Young
*Assistant Examiner* — Brian Butcher
(74) *Attorney, Agent, or Firm* — Winston Hsu; Scott Margo

(57) ABSTRACT

A touch panel comprises a substrate and a transparent conductive layer including a plurality of groups of first conductive patterns, second conductive patterns, and third conductive patterns, and a plurality of first wires, second wires, and third wires. Each group of first conductive patterns is arranged along a first direction. Each group of second conductive patterns is arranged along a second direction and located at a first side of the second direction. Each group of third conductive patterns is arranged along the second direction and located at a second side of the second direction. Each group of first conductive patterns, each group of second conductive patterns, and each group of third conductive patterns are electrically insulated to each other. Each second conductive pattern among each group of second conductive patterns has different areas, and each third conductive pattern among each group of third conductive patterns has different areas.

3 Claims, 8 Drawing Sheets

TOUCH PANEL WITH UNBALANCED CONDUCTIVE PATTERNS, AND TOUCH-CONTROLLED APPARATUS AND METHOD FOR DETERMINING MULTI-TOUCH THEREOF

BACKGROUND OF THE INVENTION

1. Field of the Invention

The present invention relates to a touch panel and a related device and method, and more particularly, to a touch panel having unbalanced conductive patterns and a related device and method capable of determining multi-touch positions.

2. Description of the Prior Art

In today's consumer electronics markets, portable electronic products such as personal digital assistants (PDAs), mobile phones, and PDA phones have already adopted a touch panel as their interface tool for data communication. Traditional touch panels mainly include resistive touch panels and capacitive touch panels. The resistive touch panel orientates touch positions based on its voltage drops. The capacitive touch panel is usually equipped with sensing capacitors, and it senses touch positions by making use of capacitance variations of the sensing capacitors corresponding to touched points together with an interlaced scanning method including scanning along the horizontal direction (i.e., the X direction) and the vertical direction (i.e., the Y direction).

If there are two fingers simultaneously touching the traditional capacitive touch panel, a problem of wrong reporting of coordinates may happen. A majority of reasons leading to the traditional capacitive touch panel to wrong reporting of coordinates are resulted from the conductive patterns of the touch panel, such as the conductive patterns composed of indium tin oxide (ITO) or indium zinc oxide (IZO). Please refer to FIG. 1. FIG. 1 is a diagram showing symmetrical conductive patterns of a traditional touch panel in the prior art. The touch panel usually includes a transparent conductive layer 100, which is formed on a substrate by performing a photo engraving process (PEP). In FIG. 1, the transparent conductive layer 100 comprises a plurality of groups of first conductive patterns 160, a plurality of groups of second conductive patterns 170, a plurality of first wires 130, and a plurality of second wires 140. Each group of first conductive patterns 160 is arranged along a first direction 110 (e.g. the Y direction), each group of second conductive patterns 170 is arranged along a second direction 120 (e.g. the X direction), wherein each group of first conductive patterns 160 and each group of second conductive patterns 170 are electrically insulated to each other (not shown). Furthermore, each first wire 130 is used for electrically connecting the plurality of first conductive patterns 160 located on an identical group to each other (such as the first conductive patterns 160 located on the same column); and each second wire 140 is used for electrically connecting the plurality of second conductive patterns 170 located on an identical group to each other (such as the second conductive patterns 170 located on the same row).

As shown in FIG. 1, each of the first conductive patterns 160 has the same area, and each of the second conductive patterns 170 also has the same area. That is to say, the traditional capacitive touch panel has symmetrical conductive patterns, wherein each of the first conductive patterns 160 and each of the second conductive patterns 170 have the same area. The capacitance variations of the traditional capacitive touch panel are directly proportional to the touched area by the fingers, and the traditional capacitive touch panel senses touch positions row-by-row and column-by-column. Therefore, we should be able to know the cross-points located on which row and which column fingers have touched, but we are unable to know which points fingers have touched. For example, assume that the touched points are (X1, Y2) and (X2, Y1). However, the recognition system of the traditional capacitive touch panel is unable to differentiate the differences between these cross-points (X1, Y2), (X2, Y1) and (X1, Y1), (X2, Y2). It may respond wrong coordinates (X1, Y1) and (X2, Y2).

SUMMARY OF THE INVENTION

It is one of the objectives of the claimed invention to provide a touch panel with unbalanced conductive patterns and a related device and method capable of determining multi-touch positions to solve the abovementioned problems.

According to one embodiment, a touch panel with unbalanced conductive patterns is provided. The touch panel comprises a substrate and a transparent conductive layer. The transparent conductive layer is formed on the substrate. The transparent conductive layer includes a plurality of groups of first conductive patterns, a plurality of groups of second conductive patterns, a plurality of groups of third conductive patterns, a plurality of first wires, a plurality of second wires, and a plurality of third wires. Each group of first conductive patterns is arranged along a first direction. Each group of second conductive patterns is arranged along a second direction different from the first direction, and each group of second conductive patterns is located at a first side of the second direction. Each group of third conductive patterns is arranged along the second direction, and each group of third conductive patterns is located at a second side of the second direction opposite to the first side of the second direction. Each group of first conductive patterns, each group of second conductive patterns, and each group of third conductive patterns are electrically insulated to each other, each second conductive pattern among each group of second conductive patterns has a different area from each other, and each third conductive pattern among each group of third conductive patterns has a different area from each other. Each first wire is used for electrically connecting the plurality of first conductive patterns located on an identical group to each other, each second wire is used for electrically connecting the plurality of second conductive patterns located on an identical group to each other, and each third wire is used for electrically connecting the plurality of third conductive patterns located on an identical group to each other. The plurality of groups of first conductive patterns, the plurality of groups of second conductive patterns, and the plurality of groups of third conductive patterns are composed of indium tin oxide (ITO) or indium zinc oxide (IZO).

According to another embodiment, a touch-controlled apparatus capable of determining multi-touch positions is provided. The touch-controlled apparatus includes a touch panel, a control circuit, and a micro-processing unit. The touch panel includes a substrate, a transparent conductive layer, and a plurality of sensors. The transparent conductive layer is formed on the substrate and comprises a plurality of groups of first conductive patterns, a plurality of groups of second conductive patterns, a plurality of groups of third conductive patterns, a plurality of first wires, a plurality of second wires, and a plurality of third wires. Each group of first conductive patterns is arranged along a first direction. Each group of second conductive patterns is arranged along a second direction different from the first direction, and each group of second conductive patterns is located at a first side of the second direction. Each group of third conductive patterns is arranged along the second direction, and each group of third conductive patterns is located at a second side of the second direction opposite to the first side of the second direction. Each group of first conductive patterns, each group of second conductive patterns, and each group of third conductive patterns are electrically insulated to each other, each second conductive pattern among each group of second conductive patterns has a different area from each other, and each third conductive pattern among each group of third conductive patterns has a different area from each other. Each first wire is used for electrically connecting the plurality of first conductive patterns located on an identical group to each other, each second wire is used for electrically connecting the plurality of second conductive patterns located on an identical group to each other, and each third wire is used for electrically connecting the plurality of third conductive patterns located on an identical group to each other. The plurality of sensors detect a first touch and a second touch to respectively generate a first touch signal and a second touch signal. The control circuit is coupled to the touch panel for reading the first touch signal and the second touch signal from the touch panel to generate a control signal and for determining a first position of the first touch and a second position of the second touch according to the control signal. The micro-processing unit is coupled to the control circuit for executing a corresponding designated function according to the first touch located on the first position and the second touch located on the second position. The first direction is an X direction, and the second direction is a Y direction.

According to another embodiment, a method for determining multi-touch positions is provided. The method includes the steps of: providing a touch panel, the touch panel includes a transparent conductive layer having a plurality of groups of first conductive patterns, a plurality of groups of second conductive patterns, and a plurality of groups of third conductive patterns, each group of first conductive patterns is arranged along a first direction, each group of second conductive patterns is arranged along a second direction different from the first direction and located at a first side of the second direction, each group of third conductive patterns is arranged along the second direction and located at a second side of the second direction opposite to the first side of the second direction, wherein each group of first conductive patterns, each group of second conductive patterns, and each group of third conductive patterns are electrically insulated to each other, each second conductive pattern among each group of second conductive patterns has a different area from each other, and each third conductive pattern among each group of third conductive patterns has a different area from each other; detecting a first touch and a second touch to respectively generate a first touch signal and a second touch signal by making use of the touch panel; reading the first touch signal and the second touch signal from the touch panel to generate a control signal; determining a first position of the first touch and a second position of the second touch according to the control signal; and executing a corresponding designated function according to the first touch located on the first position and the second touch located on the second position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
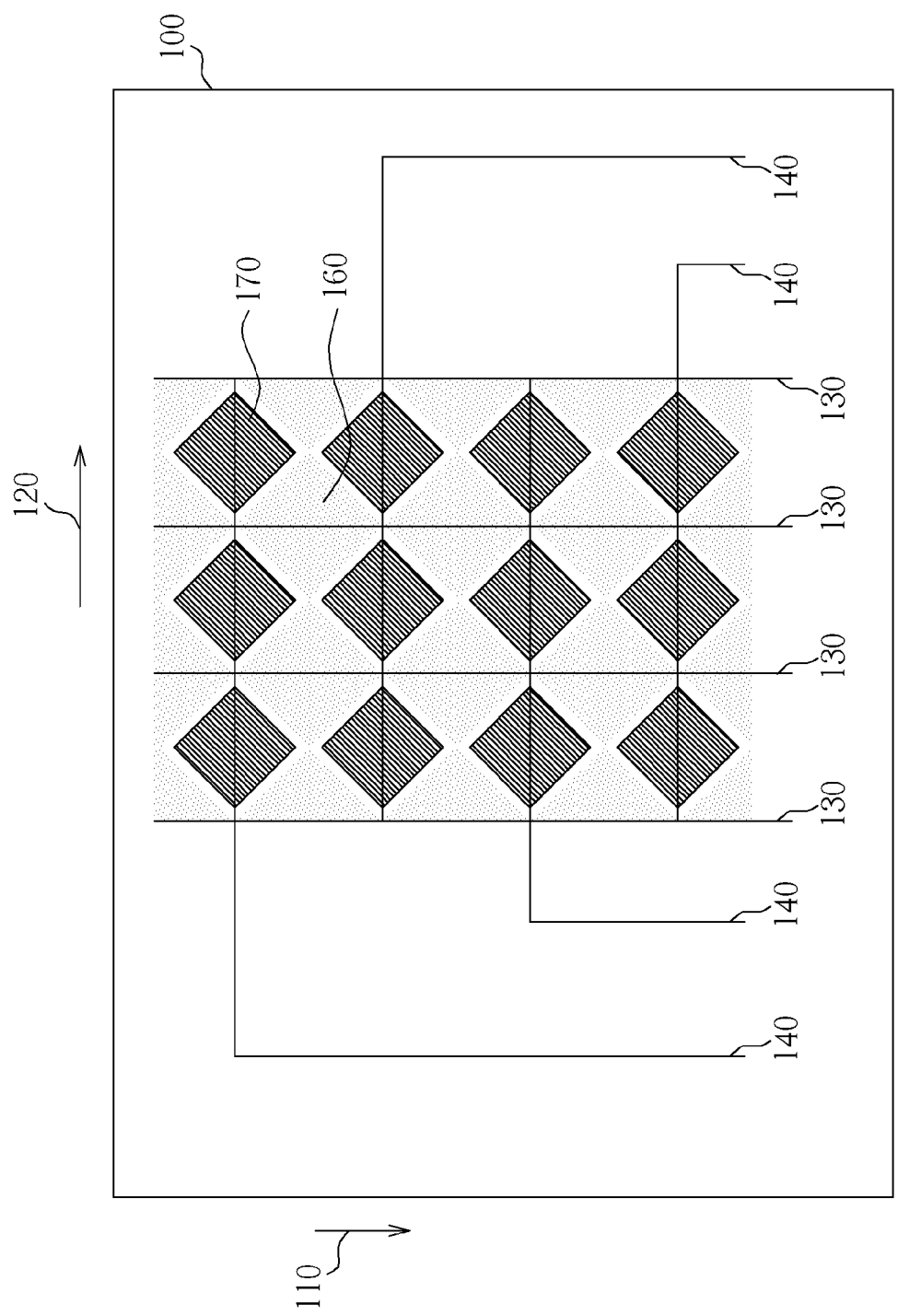
FIG. 1 is a diagram showing symmetrical conductive patterns of a traditional touch panel in the prior art.
Figure 2:
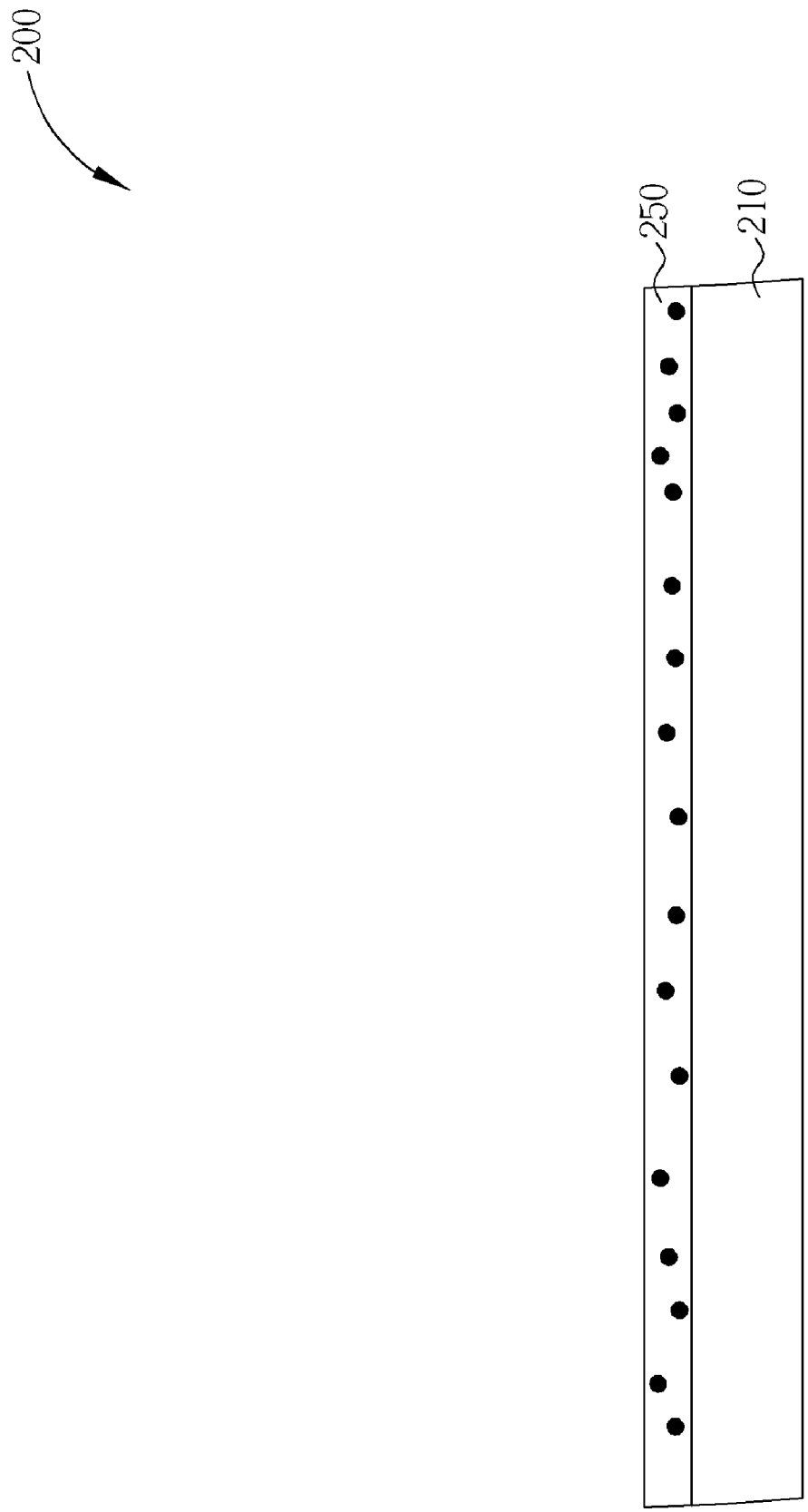
FIG. 2 is a cross-sectional view of a touch panel with unbalanced conductive patterns according to an embodiment of the present invention.

Please refer to FIG. 2. FIG. 2 is a cross-sectional view of a touch panel 200 with unbalanced conductive patterns according to an embodiment of the present invention. As shown in FIG. 2, the touch panel 200 includes, but is not limited to, a substrate 210 and a transparent conductive layer 250. The transparent conductive layer 250 is formed on the substrate 210 and comprises unbalanced conductive patterns (not shown), which can be implemented by a transparent conductive layer 300 (by reference to FIG. 3) or a transparent conductive layer 400 (by reference to FIG. 4) mentioned in the following embodiments. Details of the unbalanced conductive patterns of the transparent conductive layer 250 will be further illustrated in the following embodiments.

Please note that in the aforementioned embodiment, the touch panel 200 having a substrate 210 and a transparent conductive layer 250 is only taken as an example, but this should not be considered as limitations of the present invention. Those skilled in the art should observe that the number of the substrate and the number of the transparent conductive layer of the touch panel are not limited. In addition, the substrate 210 can be composed of glass materials or plastic materials, but the present invention is not limited to this only. The transparent conductive layer 250 can be formed by making use of vapor deposition to form it on glass materials or by sticking an organic thin film.

Figure 3:
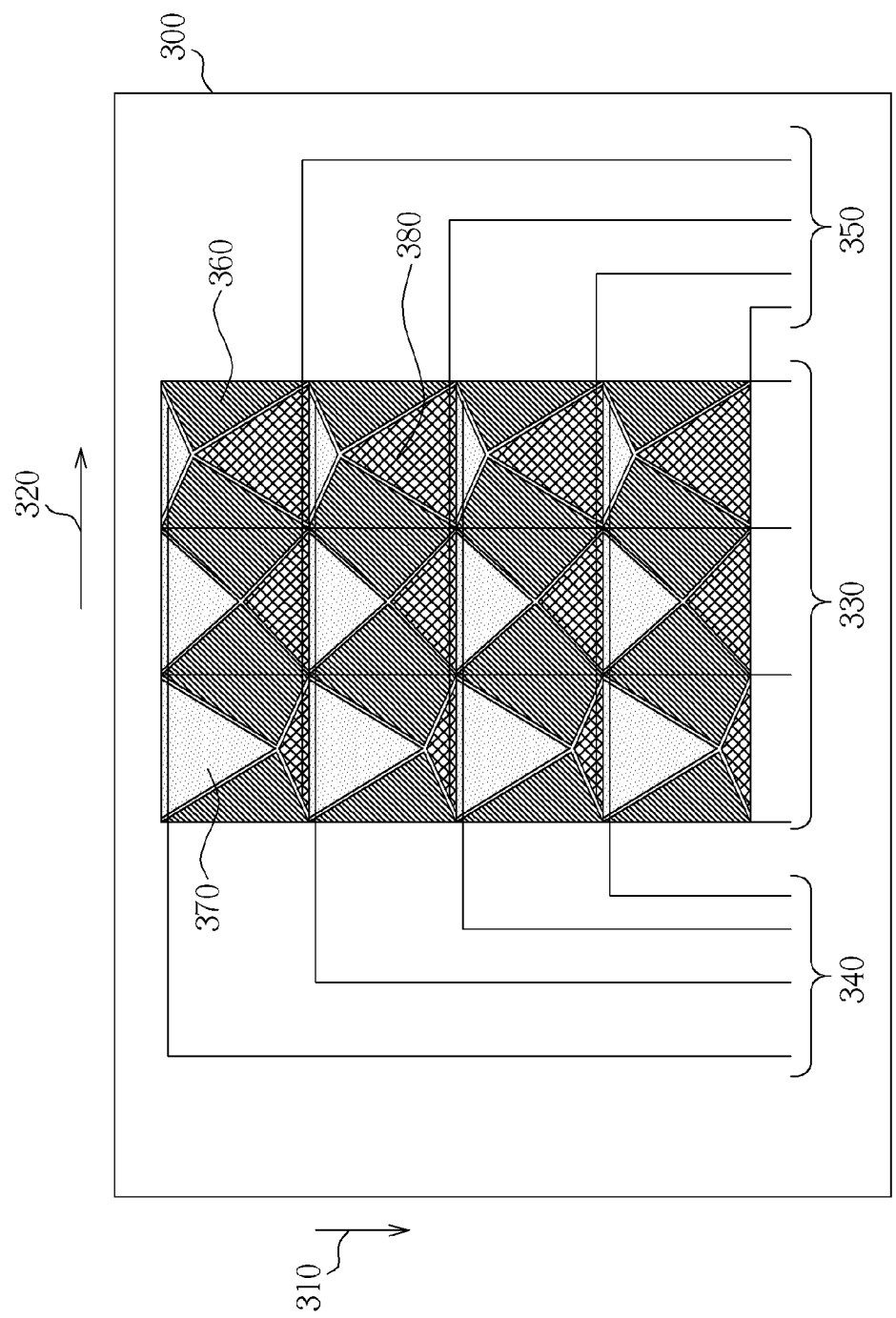
FIG. 3 is a diagram showing the unbalanced conductive patterns of the transparent conductive layer of the touch panel shown in FIG. 2 according to a first embodiment of the present invention.

Please refer to FIG. 3. FIG. 3 is a diagram showing the unbalanced conductive patterns of the transparent conductive layer of the touch panel shown in FIG. 2 according to a first embodiment of the present invention. As shown in FIG. 3, the transparent conductive layer 300 comprises a plurality of groups of first conductive patterns 360, a plurality of groups of second conductive patterns 370, a plurality of groups of third conductive patterns 380, a plurality of first wires 330, a plurality of second wires 340, and a plurality of third wires 350. Each group of first conductive patterns 360 is arranged along a first direction 310. Each group of second conductive patterns 370 is arranged along a second direction 320 different from the first direction 310, and each group of second conductive patterns 370 is located at a first side of the second direction 320 (e.g. at the bottom of the second direction 320). Each group of third conductive patterns 380 is arranged along the second direction 320, and each group of third conductive patterns 380 is located at a second side of the second direction 320 (e.g. at the top of the second direction 320). Additionally, each group of first conductive patterns 360, each group of second conductive patterns 370, and each group of third conductive patterns 380 are electrically insulated to each other (not shown). Each first wire 330 is used for electrically connecting the plurality of first conductive patterns 360 located on an identical group to each other (e.g. the first conductive patterns 360 located on the same column), each second wire 340 is used for electrically connecting the plurality of second conductive patterns 370 located on an identical group to each other (e.g. the second conductive patterns 370 located on the same row), and each third wire 350 is used for electrically connecting the plurality of third conductive patterns 380 located on an identical group to each other (e.g. the third conductive patterns 380 located on the same row).

As can be known from FIG. 3, each second conductive pattern 370 among each group of second conductive patterns (i.e. the second conductive patterns 370 located on the same row) has a different area from each other, and each third conductive pattern 380 among each group of third conductive patterns (i.e. the third conductive patterns 380 located on the same row) has a different area from each other. In other words, the touch panel disclosed in the present invention possesses unbalanced conductive patterns. Since the area of the second conductive pattern 370 is different from the area of the third conductive pattern 380 located on the same position, their resultant capacitance variations will be different from each other when a finger touches the touch panel. Therefore, the resultant capacitance variations generated from the second conductive pattern 370 and the third conductive pattern 380 located on the same position can be used for determining whether the position of the touch point is left or right. For example, the coordinate information of the X axis can be obtained by means of the first wires 330, and the coordinate information of the Y axis can be obtained by means of the second wires 340 and the third wires 350. After that, the X position of the touch can be determined by making use of the obtained coordinate information of the X axis, and the Y position of the touch can be determined by making use of the obtained coordinate information of the Y axis. Finally, the touch can be determined to be at left or at right or more than one point according to the differences of the touch on a second conductive pattern 370 and a third conductive pattern 380.

Please note that the plurality of groups of first conductive patterns 360, the plurality of groups of second conductive patterns 370, and the plurality of groups of third conductive patterns 380 mentioned above can be composed of indium tin oxide (ITO) or indium zinc oxide (IZO), but the present invention is not limited to this only and they can be formed by other materials. In this embodiment, the first direction 310 is a Y direction and the second direction 320 is an X direction, but this should not be considered to be limitations of the present invention. Those skilled in the art should observe that various modifications of the first direction and the second direction may be made without departing from the spirit of the present invention, which also belongs to the scope of the present invention.

Figure 4:
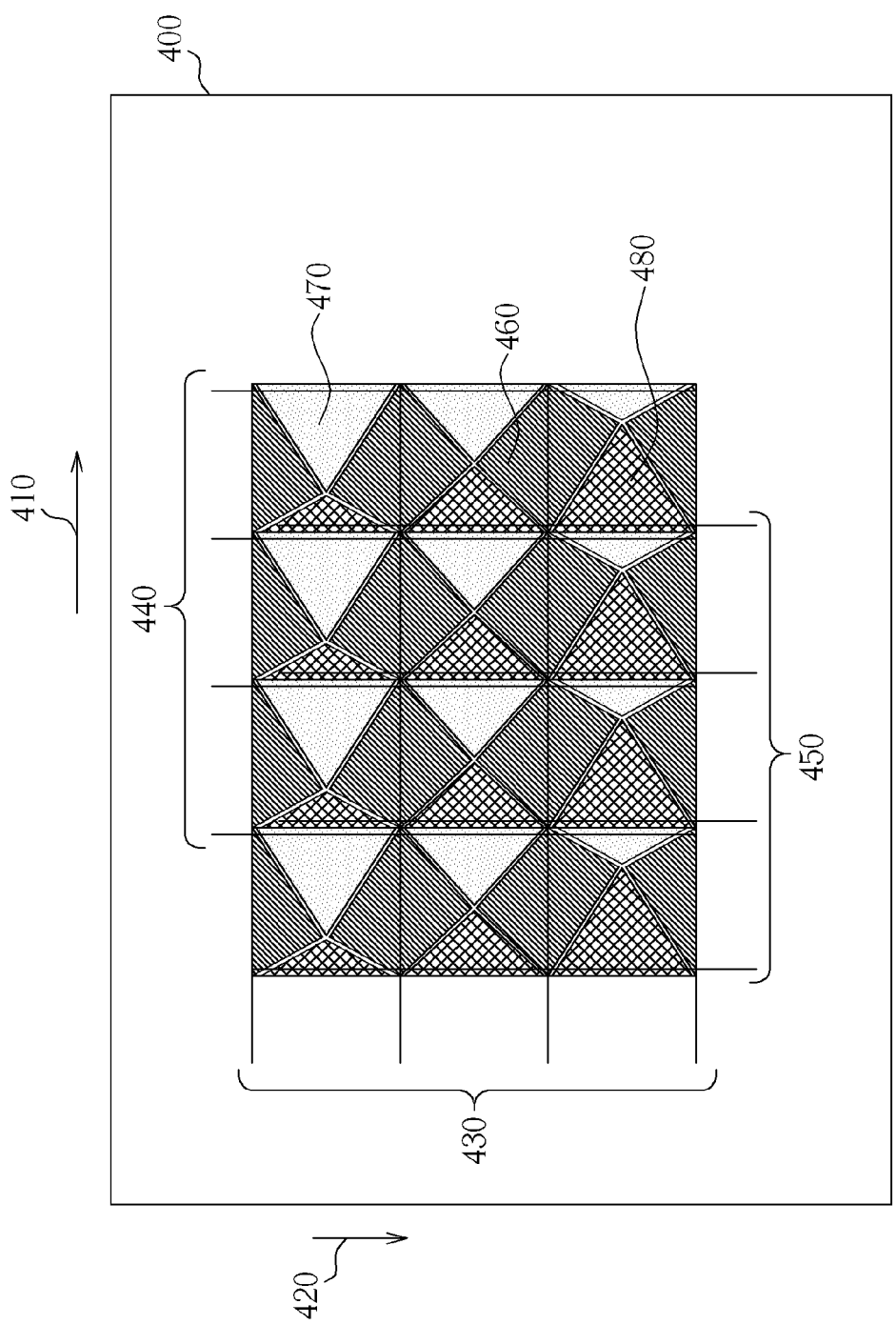
FIG. 4 is a diagram showing the unbalanced conductive patterns of the transparent conductive layer of the touch panel shown in FIG. 2 according to a second embodiment of the present invention.

Please refer to FIG. 4. FIG. 4 is a diagram showing the unbalanced conductive patterns of the transparent conductive layer of the touch panel shown in FIG. 2 according to a second embodiment of the present invention. The architecture of the transparent conductive pattern 400 shown in FIG. 4 is similar to that of the transparent conductive pattern 300 shown in FIG. 3, and the difference between them is that a first direction 410 of the transparent conductive layer 400 is an X direction and a second direction 420 of the transparent conductive layer 400 is a Y direction. As shown in FIG. 4, the transparent conductive layer 400 comprises a plurality of groups of first conductive patterns 460, a plurality of groups of second conductive patterns 470, a plurality of groups of third conductive patterns 480, a plurality of first wires 430, a plurality of second wires 440, and a plurality of third wires 450. Each group of first conductive patterns 460 is arranged along the first direction 410 (i.e. the X direction). Each group of second conductive patterns 470 is arranged along the second direction 420 different from the first direction 410, and each group of second conductive patterns 470 is located at a first side of the second direction 420 (e.g. at the left of the second direction 420). Each group of third conductive patterns 480 is arranged along the second direction 420, and each group of third conductive patterns 480 is located at a second side of the second direction 420 (e.g. at the right of the second direction 420). Additionally, each group of first conductive patterns 460, each group of second conductive patterns 470, and each group of third conductive patterns 480 are electrically insulated to each other (not shown). Each first wire 430 is used for electrically connecting the plurality of first conductive patterns 460 located on an identical group to each other (e.g. the first conductive patterns 460 located on the same row), each second wire 440 is used for electrically connecting the plurality of second conductive patterns 470 located on an identical group to each other (e.g. the second conductive patterns 470 located on the same column), and each third wire 450 is used for electrically connecting the plurality of third conductive patterns 480 located on an identical group to each other (e.g. the third conductive patterns 480 located on the same column).

Figure 5:
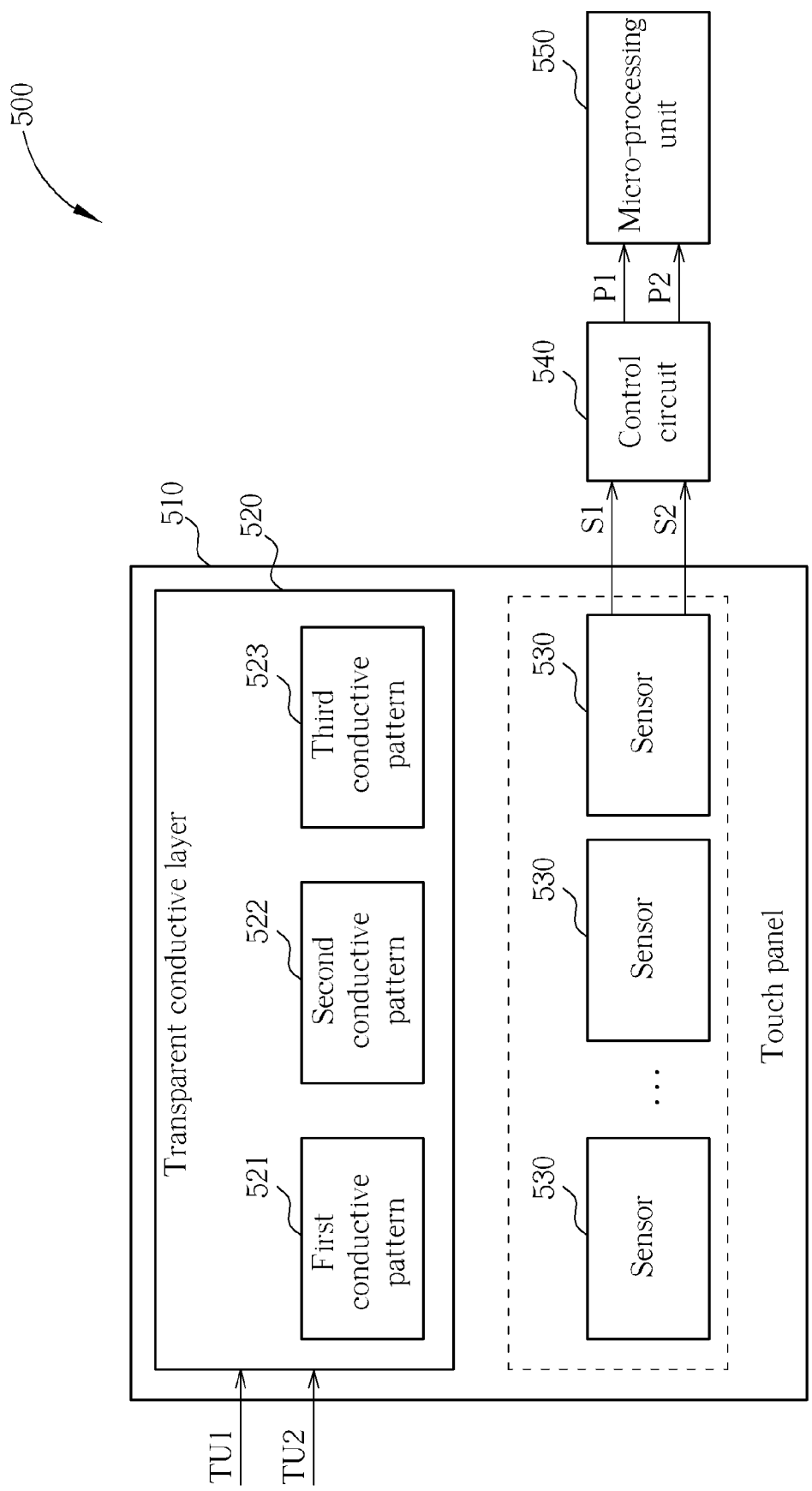
FIG. 5 is a block diagram of a touch-controlled apparatus capable of determining multi-touch positions according to an embodiment of the present invention.

Please refer to FIG. 5. FIG. 5 is a block diagram of a touch-controlled apparatus 500 capable of determining multi-touch positions according to an embodiment of the present invention. As shown in FIG. 5, the touch-controlled apparatus 500 includes, but is not limited to, a touch panel 510, a control circuit 540, and a micro-processing unit 550. The touch panel 510 comprises a transparent conductive layer 520 and a plurality of sensors 530. The transparent conductive layer 520 comprises a plurality of groups of first conductive patterns 521, a plurality of groups of second conductive patterns 522, and a plurality of groups of third conductive patterns 523, wherein the plurality of groups of first conductive patterns 521 can be implemented by the first conductive patterns 360 shown in FIG. 3 or the first conductive patterns 460 shown in FIG. 4, the plurality of groups of second conductive patterns 522 can be implemented by the second conductive patterns 370 shown in FIG. 3 or the second conductive patterns 470 shown in FIG. 4, and the plurality of groups of third conductive patterns 523 can be implemented by the third conductive patterns 380 shown in FIG. 3 or the third conductive patterns 480 shown in FIG. 4. The plurality of sensors 530 detect a first touch TU1 and a second touch TU2 via the plurality of groups of first conductive patterns 521, the plurality of groups of second conductive patterns 522, and the plurality of groups of third conductive patterns 523, and respectively generate a first touch signal S1 and a second touch signal S2. The control circuit 540 is coupled to the touch panel 510 for reading the first touch signal S1 and the second touch signal S2 from the touch panel 510 to generate a control signal and for determining a first position P1 of the first touch TU1 and a second position P2 of the second touch TU2 according to the control signal. The micro-processing unit 550 is coupled to the control circuit 540. The micro-processing unit 550 executes a corresponding designated function (such as zoom-in or zoom-out functions) according to the first touch TU1 located on the first position P1 and the second touch TU2 located on the second position P2.

Please note that the abovementioned touch panels 200 and 510 can be a capacitive touch panel, and the first touch signal S1 and the second touch signal S2 can be capacitance variations. But the present invention is not limited to this only, and the touch panels 200 and 510 can be touch panels of other types. Furthermore, the touch-controlled apparatus 500 can be a mobile phone or a personal digital assistant (PDA). But this is not meant to be a limitation of the present invention, and it can be a touch-controlled apparatus of other types.

Figure 6:
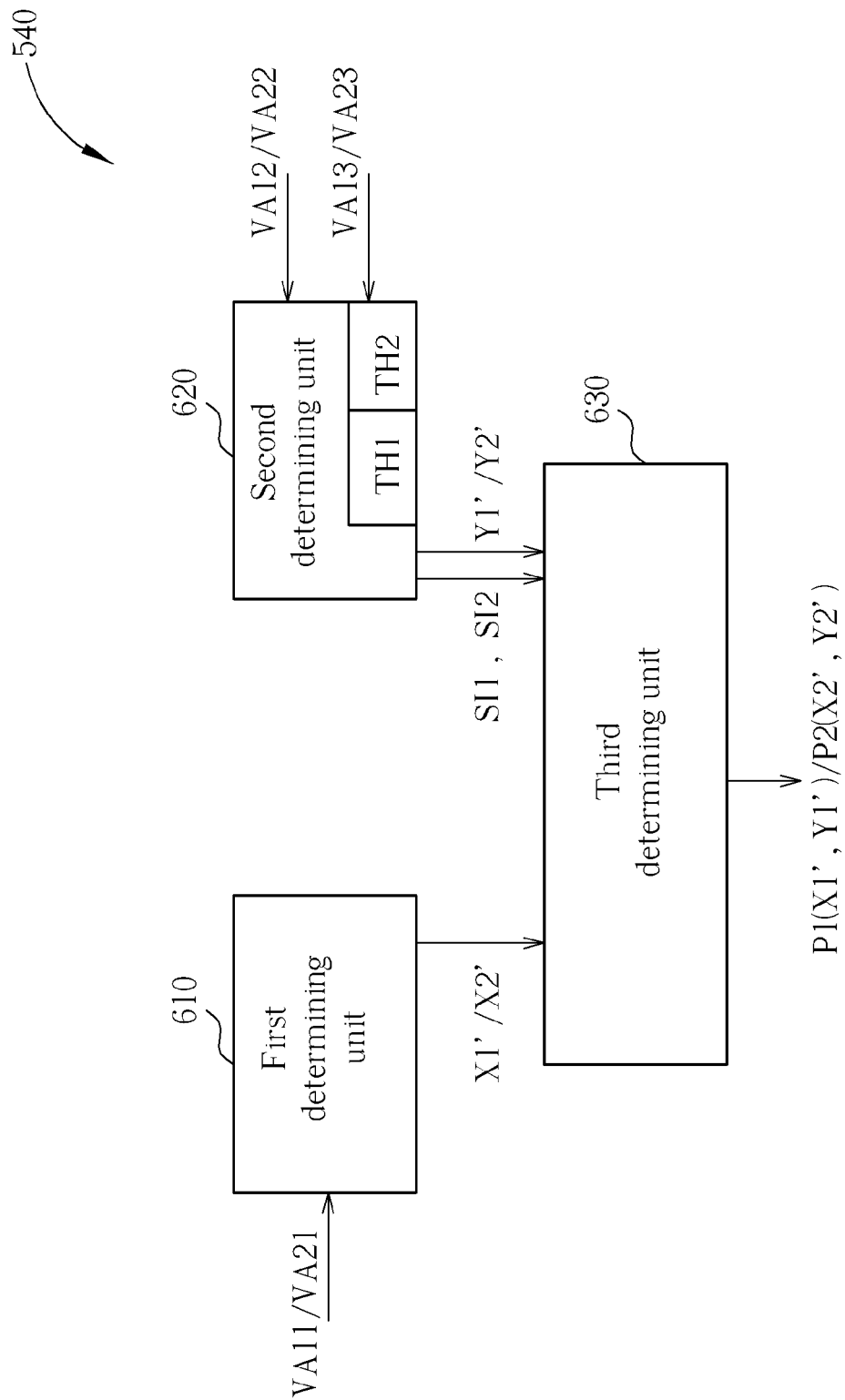
FIG. 6 is a diagram illustrating an embodiment of the control circuit shown in FIG. 5.

Please refer to FIG. 6. FIG. 6 is a diagram illustrating an embodiment of the control circuit 540 shown in FIG. 5. In this embodiment, the control circuit 540 includes a first determining unit 610, a second determining unit 620, and a third determining unit 630. The first determining unit 610 obtains a first coordinate (e.g. X1') of the first touch TU1 according to a value VA11 of the first touch signal S1 on one of the first conductive patterns (such as 360 or 460), and obtains a first coordinate (e.g. X2') of the second touch TU2 according to a value VA21 of the second touch signal S2 on another one of the first conductive patterns (such as 360 or 460). The second determining unit 620 obtains a second coordinate (e.g. Y1') of the first touch TU1 according to a value VA12 of the first touch signal S1 on one of the second conductive patterns (such as 370 or 470) and a value VA13 of the first touch signal S1 on one of the third conductive patterns (such as 380 or 480), and obtains a second coordinate (e.g. Y2') of the second touch TU2 according to a value VA22 of the second touch signal S2 on another one of the second conductive patterns (such as 370 or 470) and a value VA23 of the second touch signal S2 on another one of the third conductive patterns (such as 380 or 480). In addition, the second determining unit 620 generates a first information SI1 related to the position of the first touch TU1 (at left or right) according to the abovementioned values VA12 and VA13, and generates a second information SI2 related to the position of the second touch TU2 (at left or right) according to the abovementioned values VA22 and VA23. Lastly, the third determining unit 630 makes use of the first information SI1 to determine the first position P1 of the first touch TU1 according to the first coordinate X1' and the second coordinate Y1' of the first touch TU1, and makes use of the second information SI2 to determine the second position P2 of the second touch TU2 according to the first coordinate X2' and the second coordinate Y2' of the second touch TU2.

In the following descriptions, several examples are used for illustrating how the control circuit 540 determines the multi-touch positions. Firstly, assume that the first position P1 of the first touch TU1 falls on the coordinates (X1', Y1') and the second position P2 of the second touch TU2 falls on the coordinates (X2', Y2').

The first determining unit 610 obtains the first coordinate X1' of the first touch TU1 according to the value VA11 of the first touch signal S1 on one of the first conductive patterns, and obtains the first coordinate X2' of the second touch TU2 according to the value VA21 of the second touch signal S2 on another one of the first conductive patterns. The abovementioned steps can be represented by the following equations:

$$X1' = VA11 \qquad (1); \text{ and}$$

$$X2' = VA21 \qquad (2)$$

After that, the second determining unit 620 obtains the second coordinate Y1' of the first touch TU1 according to the value VA12 of the first touch signal S1 on one of the second conductive patterns together with the value VA13 of the first touch signal S1 on one of the third conductive patterns, and obtains the second coordinate Y2' of the second touch TU2 according to the value VA22 of the second touch signal S2 on another one of the second conductive patterns together with the value VA23 of the second touch signal S2 on another one of the third conductive patterns. The abovementioned steps can be represented by the following equations:

$$Y1' = VA12 + VA13 \qquad (3); \text{ and}$$

$$Y2' = VA22 + VA23 \qquad (4)$$

As a result, four possible coordinates (X1', Y1'), (X1', Y2'), (X2', Y1'), and (X2', Y2') will be obtained. Take the transparent conductive layer 300 shown in FIG. 3 as the example. Since the area of the second conductive pattern 370 is different from the area of the third conductive pattern 380 located on the same position, their resultant capacitance variations will be different from each other. At this time, the second determining unit 620 can further determine whether the second coordinate Y1' of the first touch TU1 is located at left or right side (i.e. the first information SI1) according to the value VA12 of the first touch signal S1 on one of the second conductive patterns as well as the value VA13 of the first touch signal S1 on one of the third conductive patterns. For example, when the result of (VA12-VA13) is greater than a first threshold TH1, the second coordinate Y1' is determined to be located at left side; when the result of (VA12-VA13) is smaller than a second threshold TH2, the second coordinate Y1' is determined to be located at right side; and when the result of (VA12-VA13) is in-between the first threshold TH1 and the second threshold TH2, the second coordinate Y1' is determined to be located in the middle.

Similarly, the second determining unit 620 can further determine whether the second coordinate Y2' of the second touch TU2 is located at left or right side (i.e. the second information SI2) according to the value VA22 of the second touch signal S2 on another one of the second conductive patterns as well as the value VA23 of the second touch signal S2 on another one of the third conductive patterns. For example, when the result of (VA22-VA23) is greater than the first threshold TH1, the second coordinate Y2' is determined to be located at left side; when the result of (VA22-VA23) is smaller than the second threshold TH2, the second coordinate Y2' is determined to be located at right side; and when the result of (VA22-VA23) is in between the first threshold TH1 and the second threshold TH2, the second coordinate Y2' is determined to be located in the middle.

Please note that the aforementioned thresholds TH1 and TH2 are not fixed, and can be adjusted based on actual demands and actual applications. It will be obvious to those skilled in the art that various modifications of the thresholds TH1 and TH2 may be made without departing from the spirit of the present invention.

Finally, the third determining unit 630 can make use of the first information SI1 to determine that the first position P1 of the first touch TU1 falls on the coordinates (X1', Y1') according to the first coordinate X1' and the second coordinate Y1' of the first touch TU1, and can make use of the second information SI2 to determine that the second position P2 of the second touch TU2 falls on the coordinates (X2', Y2') according to the first coordinate X2' and the second coordinate Y2' of the second touch TU2.

The abovementioned embodiment takes the transparent conductive layer 300 shown in FIG. 3 as the example, but this is presented merely for describing the features of the present invention. Those skilled in the art should readily know that this is not a limitation of the present invention.

Figure 7:
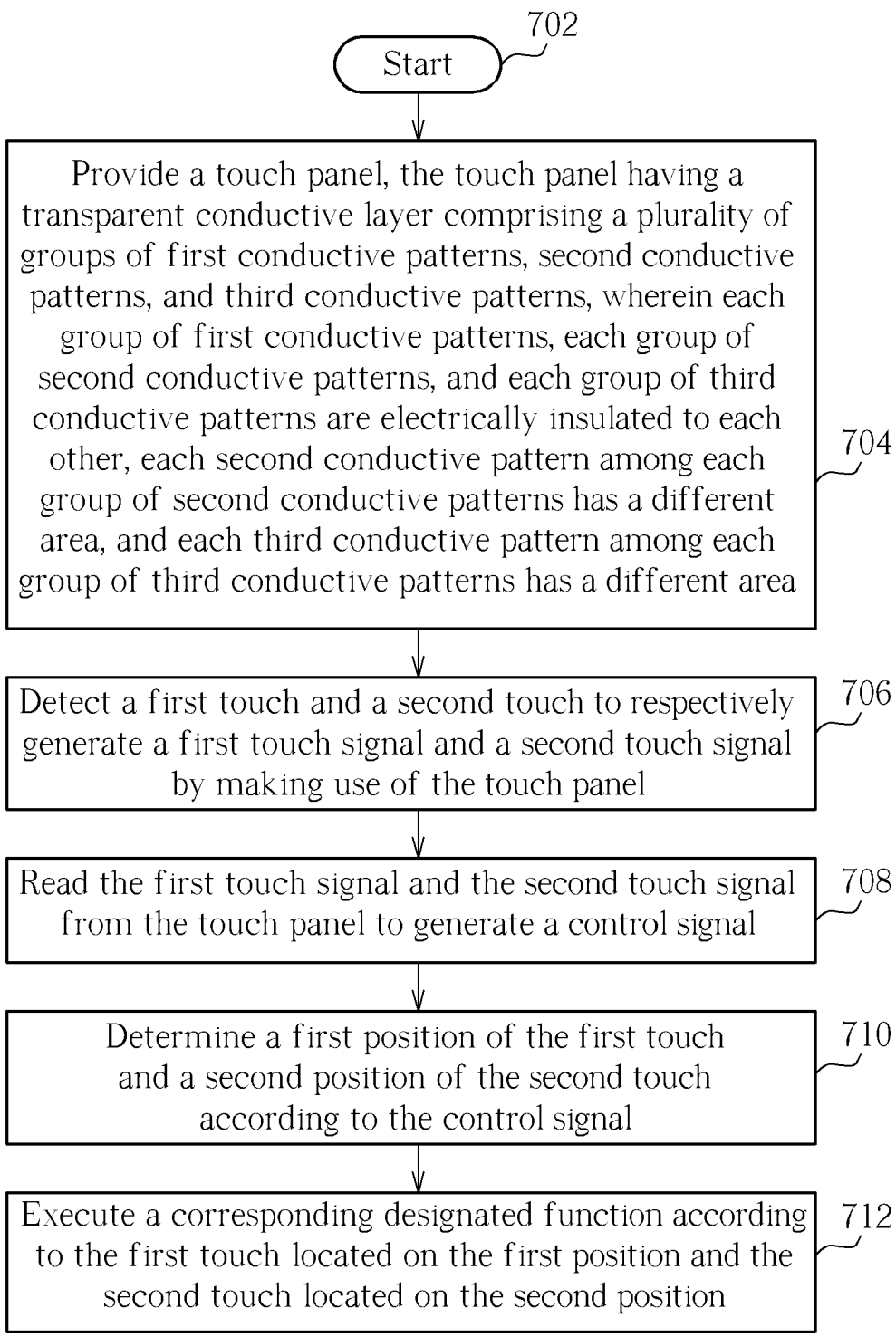
FIG. 7 is a flowchart illustrating a method for determining multi-touch positions according to an exemplary embodiment of the present invention.

FIG. 7 is a flowchart illustrating a method for determining multi-touch positions according to an exemplary embodiment of the present invention. Please note that the following steps are not limited to be performed according to the exact sequence shown in FIG. 7 if a roughly identical result can be obtained. The method includes, but is not limited to, the following steps:

Step 702: Start.

Step 704: Provide a touch panel, the touch panel having a transparent conductive layer comprising a plurality of groups of first conductive patterns, a plurality of groups of second conductive patterns, and a plurality of groups of third conductive patterns, each group of first conductive patterns being arranged along a first direction, each group of second conductive patterns being arranged along a second direction different from the first direction and being located at a first side of the second direction, each group of third conductive patterns being arranged along the second direction and being located at a second side of the second direction opposite to the first side of the second direction, wherein each group of first conductive patterns, each group of second conductive patterns, and each group of third conductive patterns are electrically insulated to each other, each second conductive pattern among each group of second conductive patterns has a different area from each other, and each third conductive pattern among each group of third conductive patterns has a different area from each other.

Step 706: Detect a first touch and a second touch to respectively generate a first touch signal and a second touch signal by making use of the touch panel.

Step 708: Read the first touch signal and the second touch signal from the touch panel to generate a control signal.

Step 710: Determine a first position of the first touch and a second position of the second touch according to the control signal.

Step 712: Execute a corresponding designated function according to the first touch located on the first position and the second touch located on the second position.

How each element operates can be known by collocating the steps shown in FIG. 7 and the elements shown in FIG. 5, and further description is omitted here for brevity. Be noted that the step 706 is executed by the touch panel 510, the steps 708 and 710 are executed by the control circuit 540, and the step 712 is executed by the micro-processing unit 550.

Please note that, the steps of the abovementioned flowchart are presented merely for describing the present invention, and in no way should be considered to be limitations of the scope of the present invention. Those skilled in the art should observe that the method shown in FIG. 7 can include other intermediate steps or several steps can be merged into a single step without departing from the spirit of the present invention. For example, the step 710 can further include several detailed steps. Please refer to FIG. 8, which is a flowchart illustrating the detailed steps of determining the first position of the first touch and the second position of the second touch (i.e. the step 710) shown in FIG. 7. The method includes, but is not limited to, the following steps:

Step 810: Obtain a first coordinate of the first touch according to a first value of the first touch signal on one of the first conductive patterns. After that, go to Step 812.

Step 812: Obtain a second coordinate of the first touch according to a third value of the first touch signal on one of the second conductive patterns and a fourth value of the first touch signal on one of the third conductive patterns. After that, go to Step 830.

Step 820: Obtain a first coordinate of the second touch according to a second value of the second touch signal on another one of the first conductive patterns. After that, go to Step 822.

Step 822: Obtain a second coordinate of the second touch according to a fifth value of the second touch signal on another one of the second conductive patterns and a sixth value of the second touch signal on another one of the third conductive patterns. After that, go to Step 830.

Step 830: Generate a first information related to the position of the first touch (at left or right) according to the third value and the fourth value, and generate a second information related to the position of the second touch (at left or right) according to the fifth value and the sixth value. Go to the steps 840 and 850.

Step 840: Make use of the first information to determine the first position of the first touch according to the first coordinate and the second coordinate of the first touch.

Step 850: Make use of the second information to determine the second position of the second touch according to the first coordinate and the second coordinate of the second touch.

Figure 8:
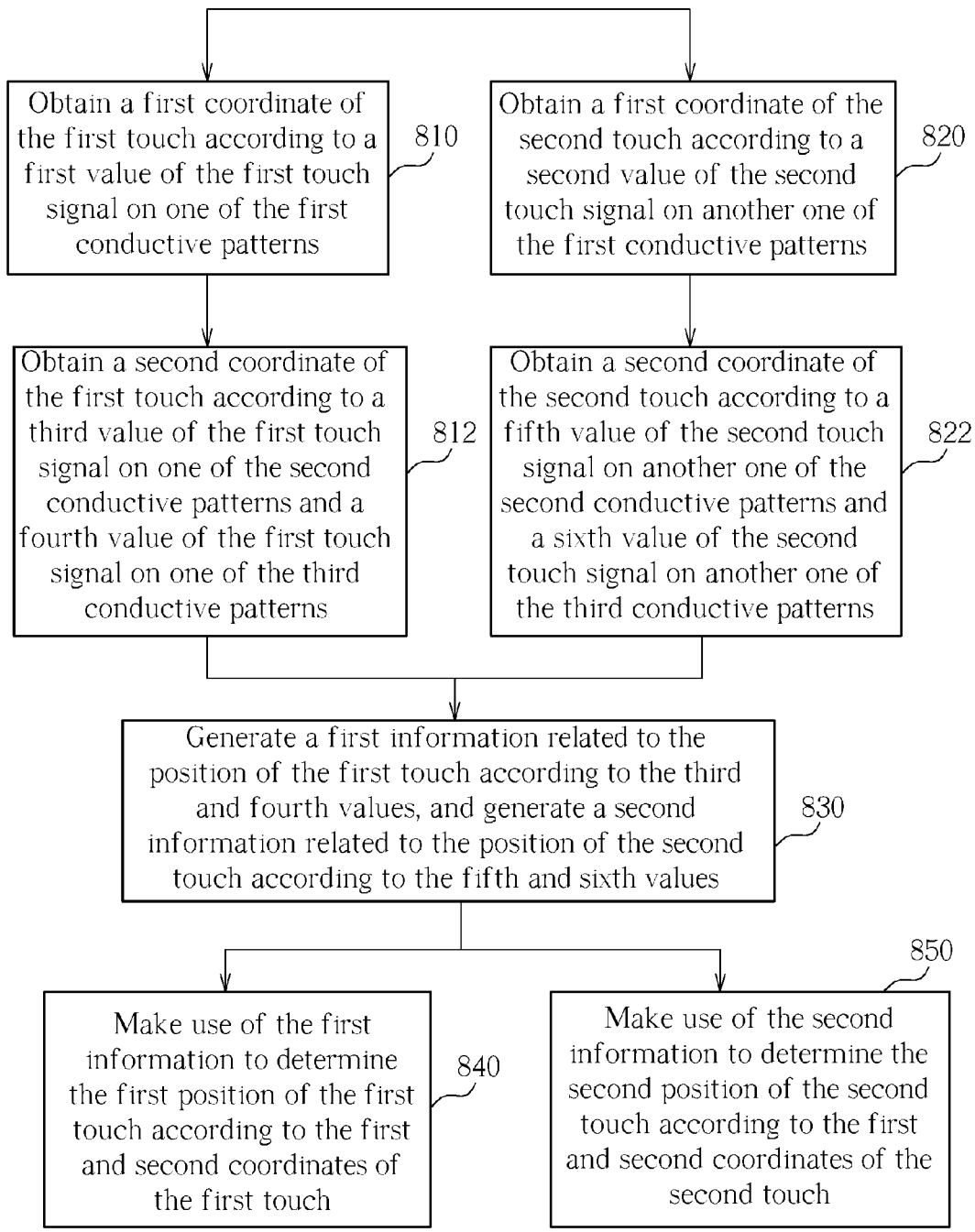
FIG. 8 is a flowchart illustrating the detailed steps of the step 710 shown in FIG. 7

How each element operates can be known by collocating the steps shown in FIG. 8 and the elements shown in FIG. 6, and further description is omitted here for brevity. Be noted that the steps 810 and 820 are executed by the first determining unit 610, the steps 812, 822, and 830 are executed by the second determining unit 620, and the steps 840 and 850 are executed by the third determining unit 630.

Please note that, the abovementioned steps 810-850 are presented merely for describing the present invention, and in no way should be considered to be limitations of the scope of the present invention. Those skilled in the art should observe that other means can be adopted to implement the step of determining the first position of the first touch and the second position of the second touch if the same goal can be achieved without departing from the spirit of the present invention. Furthermore, the steps shown in FIG. 7 and FIG. 8 are not limited to be performed according to the exact sequence shown in the abovementioned embodiments, appropriate adjustments may be made so as to obtain the desired result. For example, the execution sequence of the steps 810 and 812 can be swapped to each other, and the execution sequence of the steps 820 and 822 can be swapped to each other, which also belongs to the scope of the present invention.

The abovementioned embodiments are presented merely for describing the features of the present invention, and in no way should be considered to be limitations of the scope of the present invention. In summary, the present invention provides a touch panel with unbalanced conductive patterns and a related device and method capable of determining multi-touch positions. By making use of the touch panel with unbalanced conductive patterns (e.g. composed of ITO or IZO) disclosed in the present invention, the resultant capacitance variations will be different from each other since the area of the second conductive pattern 370/470 is different from the area of the third conductive pattern 380/480 located on the same position. As a result, the resultant capacitance variations of the second conductive pattern 370/470 and the third conductive pattern 380/480 located on the same position can be used for determining whether the position of the touch point is at the left/top or at the right/bottom. Therefore, if there are two (or more) touch points occur on the touch panel simultaneously, the accurate coordinates of these touch points can be easily differentiated by the recognition system of the touch panel disclosed in the present invention in order to avoid wrong reporting of coordinates in the prior art. Moreover, the device and mechanism disclosed in the present invention can be easily implemented without raising the cost on hardware manufactures.

Those skilled in the art will readily observe that numerous modifications and alterations of the device and method may be made while retaining the teachings of the invention.

What is claimed is:

1. A touch-controlled apparatus capable of determining multi-touch positions, comprising:
   a touch panel, having unbalanced conductive patterns, the touch panel comprising:
      a substrate;
      a transparent conductive layer, formed on the substrate, the transparent conductive layer comprising:
         a plurality of groups of first conductive patterns, each group of first conductive patterns being arranged along a first direction;
         a plurality of groups of second conductive patterns, each group of second conductive patterns being arranged along a second direction different from the first direction, and each group of second conductive patterns being located at a first side of the second direction;
         a plurality of groups of third conductive patterns, each group of third conductive patterns being arranged along the second direction and each group of third conductive patterns being located at a second side of the second direction opposite to the first side of the second direction, wherein each group of first conductive patterns, each group of second conductive patterns, and each group of third conductive patterns are electrically insulated to each other, each second conductive pattern among each group of second conductive patterns has a different area from each other, and each third conductive pattern among each group of third conductive patterns has a different area from each other;
      a plurality of first wires, each first wire being used for electrically connecting the plurality of first conductive patterns located on an identical group to each other;
      a plurality of second wires, each second wire being used for electrically connecting the plurality of second conductive patterns located on an identical group to each other; and
      a plurality of third wires, each third wire being used for electrically connecting the plurality of third conductive patterns located on an identical group to each other; and
   a plurality of sensors, for detecting a first touch and a second touch to respectively generate a first touch signal and a second touch signal;
   a control circuit, coupled to the touch panel, for reading the first touch signal and the second touch signal from the touch panel to generate a control signal, and for determining a first position of the first touch and a second position of the second touch according to the control signal; and
   a micro-processing unit, coupled to the control circuit, for executing a corresponding designated function according to the first touch located on the first position and the second touch located on the second position;
   wherein the control circuit further comprises:
      a first determining unit, for obtaining a first coordinate of the first touch according to a first value of the first touch signal on one of the first conductive patterns, and for obtaining a first coordinate of the second touch according to a second value of the second touch signal on another one of the first conductive patterns;
      a second determining unit, for obtaining a second coordinate of the first touch according to a third value of the first touch signal on one of the second conductive patterns and a fourth value of the first touch signal on one of the third conductive patterns, for obtaining a second coordinate of the second touch according to a fifth value of the second touch signal on another one of the second conductive patterns and a sixth value of the second touch signal on another one of the third conductive patterns, for generating a first information related to the position of the first touch according to the third value and the fourth value, and for generating a second information related to the position of the second touch according to the fifth value and the sixth value; and
      a third determining unit, for making use of the first information to determine the first position of the first touch according to the first coordinate and the second coordinate of the first touch, and for making use of the second information to determine the second position of the second touch according to the first coordinate and the second coordinate of the second touch.

2. A method for determining multi-touch positions, comprising:
   providing a touch panel, the touch panel having a transparent conductive layer comprising a plurality of groups of first conductive patterns, a plurality of groups of second conductive patterns, and a plurality of groups of third conductive patterns, each group of first conductive patterns being arranged along a first direction, each group of second conductive patterns being arranged along a second direction different from the first direction and being located at a first side of the second direction, each group of third conductive patterns being arranged along the second direction and being located at a second side of the second direction opposite to the first side of the second direction, wherein each group of first conductive patterns, each group of second conductive patterns, and each group of third conductive patterns are electrically insulated to each other, each second conductive pattern among each group of second conductive patterns has a different area from each other, and each third conductive pattern among each group of third conductive patterns has a different area from each other;
   detecting a first touch and a second touch to respectively generate a first touch signal and a second touch signal by making use of the touch panel;
   reading the first touch signal and the second touch signal from the touch panel to generate a control signal;
   determining a first position of the first touch and a second position of the second touch according to the control signal; and
   executing a corresponding designated function according to the first touch located on the first position and the second touch located on the second position;
   wherein the step of determining the first position of the first touch comprises:
      obtaining a first coordinate of the first touch according to a first value of the first touch signal on one of the first conductive patterns;
      obtaining a second coordinate of the first touch according to a third value of the first touch signal on one of the second conductive patterns and a fourth value of the first touch signal on one of the third conductive patterns;

generating a first information related to the position of the first touch according to the third value and the fourth value; and making use of the first information to determine the first position of the first touch according to the first coordinate and the second coordinate of the first touch.

3. A method for determining multi-touch positions, comprising:

providing a touch panel, the touch panel having a transparent conductive layer comprising a plurality of groups of first conductive patterns, a plurality of groups of second conductive patterns, and a plurality of groups of third conductive patterns, each group of first conductive patterns being arranged along a first direction, each group of second conductive patterns being arranged along a second direction different from the first direction and being located at a first side of the second direction, each group of third conductive patterns being arranged along the second direction and being located at a second side of the second direction opposite to the first side of the second direction, wherein each group of first conductive patterns, each group of second conductive patterns, and each group of third conductive patterns are electrically insulated to each other, each second conductive pattern among each group of second conductive patterns has a different area from each other, and each third conductive pattern among each group of third conductive patterns has a different area from each other;

detecting a first touch and a second touch to respectively generate a first touch signal and a second touch signal by making use of the touch panel;

reading the first touch signal and the second touch signal from the touch panel to generate a control signal;

determining a first position of the first touch and a second position of the second touch according to the control signal; and executing a corresponding designated function according to the first touch located on the first position and the second touch located on the second position;

wherein the step of determining the second position of the second touch comprises:

obtaining a first coordinate of the second touch according to a second value of the second touch signal on another one of the first conductive patterns;

obtaining a second coordinate of the second touch according to a fifth value of the second touch signal on another one of the second conductive patterns and a sixth value of the second touch signal on another one of the third conductive patterns;

generating a second information related to the position of the second touch according to the fifth value and the sixth value; and making use of the second information to determine the second position of the second touch according to the first coordinate and the second coordinate of the second touch.

* * * * *